UNITED STATES PATENT OFFICE.

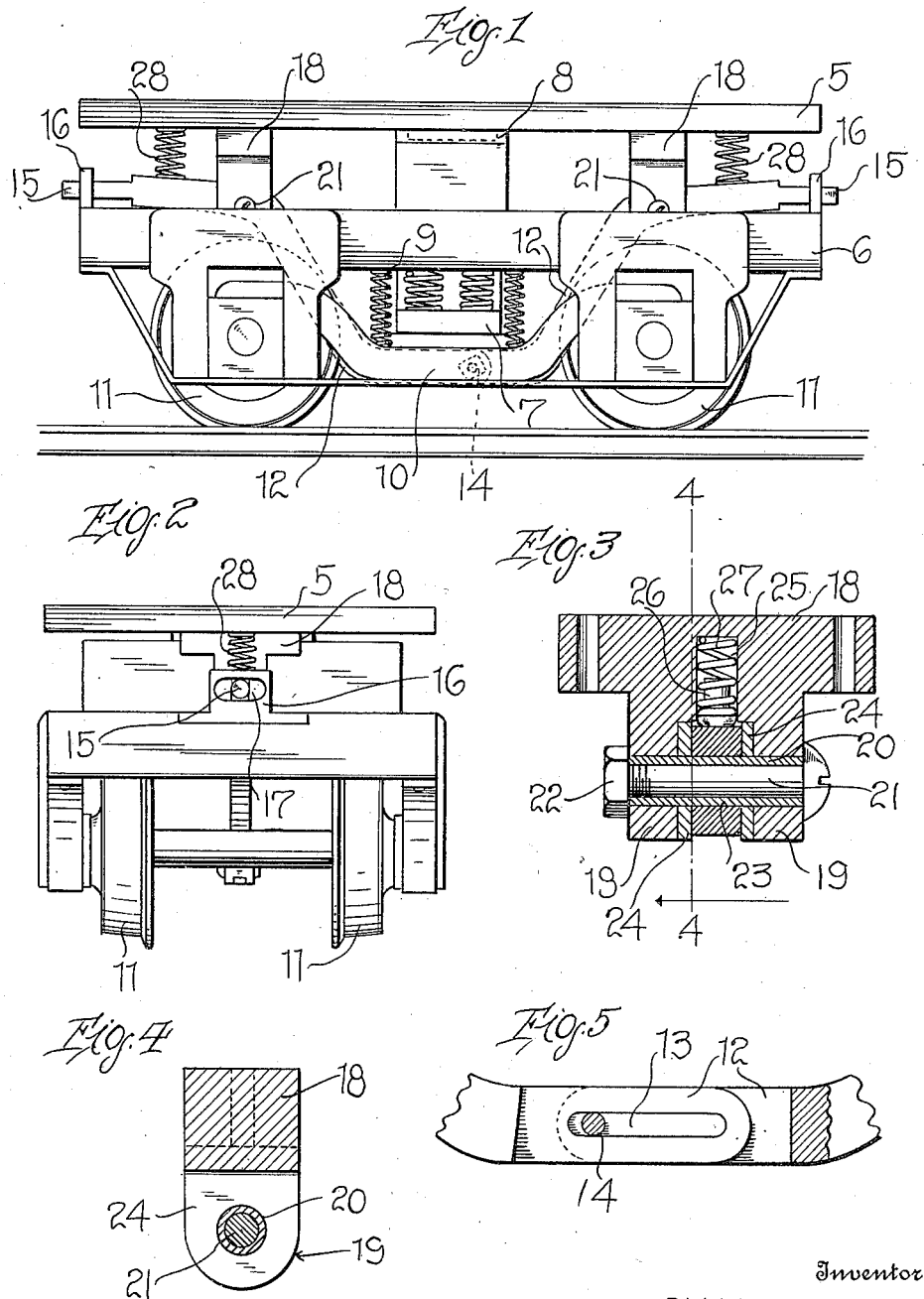

JAMES H. HOUSMAN AND CHARLES F. JORDAN, OF CLIFTON FORGE, VIRGINIA.

EQUALIZER FOR CAR-TRUCKS.

1,092,530.

Specification of Letters Patent.

Patented Apr. 7, 1914.

Application filed October 27, 1913. Serial No. 797,548.

*To all whom it may concern:*

Be it known that we, JAMES H. HOUSMAN and CHARLES F. JORDAN, citizens of the United States, residing at Clifton Forge, in the county of Alleghany and State of Virginia, have invented certain new and useful Improvements in Equalizers for Car-Trucks, of which the following is a specification, reference being had to the accompanying drawings.

This invention relates to improvements in equalizing devices for car trucks such as that shown and described in prior Patent No. 570,875, dated November 3, 1896, and has for its principal object to provide improved means for mounting the car or coach body upon the truck whereby the transmission of noise or sound in the movement of the car with relation to the truck is absolutely prevented, and wear upon the several movable elements of the equalizer reduced to a minimum.

Our invention has for another and more specific object to provide an equalizer for car trucks embodying relatively movable levers which operate to maintain both ends of the truck in the same relation to the car at all times, and an improved pivot bearing for each of the levers secured to the under side of the car body whereby excessive friction is eliminated and the transmission of noise through the car floor incident to the movement of the levers in their bearings effectually overcome.

Our invention has for a further object to generally improve and increase the efficiency of devices of the above character without adding to their manufacturing cost to an appreciable extent.

With the above and other objects in view as will become apparent as the description proceeds, the invention consists in certain constructions, combinations and arrangements of the parts that we shall hereinafter fully describe and claim.

For a full understanding of the invention, reference is to be had to the following description and accompanying drawings, in which—

Figure 1 is a side elevation of a pivoted car truck mounted beneath the car and provided with the present invention; Fig. 2 is an end elevation; Fig. 3 is an enlarged section taken on the line 3—3 of Fig. 2; Fig. 4 is a section taken on the line 4—4 of Fig. 3. Fig. 5 is a detail longitudinal section through the joint of the toggle levers.

Referring in detail to the drawings, 5 designates the base or sill of the car body and 6 designates the truck frame which includes the vertically movable spring cushioned transverse bar 7. This truck is pivotally mounted in the usual manner beneath the car as indicated at 8, as shown in Patent No. 570,875, hereinbefore referred to. The usual springs 9 are interposed between the truck frame 6 and the longitudinal bars 10 which bear upon the journal boxes of the truck wheels 11.

The curved toggle levers 12 extend longitudinally of the truck, one of said levers being bifurcated at one end to receive the end of the other lever which is slotted as at 13, said slot receiving a bolt 14 mounted in the first named lever. These connected ends of the toggle levers are disposed beneath the spring seat of the transverse car supporting bar 7 while the other ends of said toggle levers extend longitudinally above the plane of the truck frame, said latter ends of the levers terminating in the cylindrical studs 15, which are disposed for sliding movement in the slots 17 of the upstanding plates 16 mounted upon the ends of the truck frame.

18 designates hanger bearings which are secured to the under side or base of the car upon opposite sides of the pivot 8. Each of these bearings include depending spaced ears 19 which are provided with openings to receive a Babbitt metal bushing 20. A bolt 21 extends through this bushing and has a nut 22 threaded upon one end thereof, whereby the bushing is retained in place. The toggle lever 12 is provided with an opening 23 to loosely receive the bushing 20. The inner opposed faces of the depending ears 19 are provided with Babbitt metal plates 24 between which the lever 12 is mounted upon the bushing for rocking movement. The body of the hanger bearing 18 is centrally provided with a socket 25 to receive a stud or pin 26. A spring 27 is engaged at one of its ends with the base of the socket, the other end of said spring bearing against a head formed on the end of the pin 26 and yieldingly holding said pin in engagement with the upper edge of the lever 12 immediately above the bushing 20.

The spring 27 through the medium of the pin 26 acts to maintain the upper portion of the opening in the lever through which the bushing 23 extends in close frictional engagement upon said bushing, thereby effectually preventing rattling of the lever which would be occasioned by wear of the parts and consequent transmission of the noise thereby produced through the floor of the car to the interior thereof. An additional spring 28 is secured at its lower end to each of the levers 12 between the bearing 18 and the cylindrical end of the lever, the upper ends of said springs being suitably secured to the under side of the car body. The springs 27 and 28 are adapted to take up lost motion and prevent vertical movement of the cylindrical ends 15 of the levers in the slots 17 of the plates 16. These springs, however, do not offer any resistance to the pivotal movement of the truck beneath the car body. Such pivotal movement of the truck with respect to the car body is of course limited by the extent of the slots 17 in which the cylindrical outer ends of the levers 12 are loosely disposed.

From the above description, it will be readily seen that by connecting the inner ends of the longitudinally disposed toggle levers for relative sliding movement, one end of the truck cannot move with respect to the car body without imparting a similar movement to the other end thereof. The truck is therefore at all times held in substantially parallel relation with the car. The levers also serve as an efficient bracing means longitudinally of the car truck and take up all longitudinal thrust without interfering with the vertical action of the truck springs. If the car truck should leave the rails, said truck may move transversely of the car upon opposite sides of its center as the truck wheels move over the ties, owing to the manner of mounting the outer ends of the toggle levers upon the ends of the truck frame, and in this manner liability of the truck being torn or wrenched away from the car body is obviated. The principal advantage gained by means of our improved construction resides, however, in the provision of the Babbitt bushings in the hanger bearings 18 upon which the toggle levers are mounted, and the use of the springs 27 and 28 which are interposed between said levers and the bearings and car base respectively. By the use of the Babbitt metal bushings, friction at the joint between the inner ends of the toggle levers is reduced to a minimum and all noise or sound which would otherwise be transmitted through the hanger bearings to the base or floor of the car is entirely dispensed with.

While we have above referred to our improvements as applied to a car truck having two pairs of truck wheels, it will be obvious that the invention is applicable to trucks of various constructions having a greater or less number of wheels as may be preferred. It will also be apparent that by means of our improved equalizer, the wheels at one end of the truck frame might be put out of commission or removed from the frame, and the car body would be sustained nevertheless in its proper position with relation to the truck frame.

From the above, it will be appreciated that we have materially improved the construction and increased the efficiency of the device shown in our prior patent hereinbefore referred to. Such improvements, however, although of material advantage do not increase the manufacturing cost of the invention to any appreciable extent. It is of course, to be understood that the invention is not limited to the specific form and construction of the several elements above described, and we therefore reserve the privilege of resorting to all such legitimate changes as may be fairly embodied within the spirit and scope of the invention, as claimed.

Having thus described the invention, what is claimed is:

1. The combination of a car body, a car truck pivotally mounted beneath said body, slotted bearings secured to the ends of the truck, toggle levers extending longitudinally of the truck and connected together at their inner ends for relative vertical movement, the outer ends of said levers being mounted in said slotted bearings, hanger bearings rigidly fixed to the under side of the car body, said levers being pivotally mounted intermediate of their ends in the respective hanger bearings, springs arranged in said bearings and engaging the upper edges of said levers, and additional springs interposed between the levers and the under side of the car body.

2. The combination of a car body, a car truck pivotally mounted beneath said body, a pair of toggle levers extending longitudinally of the car truck, a sliding pivotal connection between the inner ends of said levers, hanger bearings rigidly fixed to the under side of the car body, said levers being pivotally mounted intermediate of their ends in the respective hanger bearings, and springs arranged in the hanger bearings and bearing upon the upper edges of the levers in line with their pivots.

3. The combination of a car body, a car truck pivotally mounted beneath said body, a pair of toggle levers extending longitudinally of the truck, a sliding pivotal connection between the inner ends of said levers, hanger bearings rigidly secured to the under side of the car body, Babbitt metal bushings secured in said bearings, said toggle levers being loosely mounted upon said bushings, and springs arranged in the bearings and bearing upon the upper edges of the levers.

4. The combination of a car body, a car truck pivotally mounted beneath said car body, a pair of toggle levers extending longitudinally of the truck, a sliding pivotal connection between the inner ends of said levers, hanger bearings rigidly secured to the under side of the car body each having spaced ears, the respective levers extending between the bearing ears and each provided with an opening, a Babbitt metal bushing adapted to be fitted in the bearing ears and the opening of the levers, Babbitt metal plates secured upon the inner faces of said ears, transversely disposed plates secured upon the ends of the truck, each of said plates being provided with a slot, the ends of the respective levers being mounted in said slots whereby the truck may have limited pivotal movement with respect to the car body, and springs interposed between the upper edges of the levers and the under side of the car body and arranged between the hanger bearings and said slotted plates.

In testimony whereof we hereunto affix our signatures in the presence of two witnesses.

JAMES H. HOUSMAN.
CHARLES F. JORDAN.

Witnesses:
R. O. Artz,
J. E. Smith, Jr.

---

Copies of this patent may be obtained for five cents each, by addressing the "Commissioner of Patents, Washington, D. C."